(12) United States Patent
Hong et al.

(10) Patent No.: US 11,237,316 B2
(45) Date of Patent: Feb. 1, 2022

(54) OPTICAL DEVICE WITH REDUCED CHROMATIC ABERRATION AND DISPLAY DEVICE INCLUDING THE SAME

(71) Applicant: SAMSUNG ELECTRONICS CO., LTD., Suwon-si (KR)

(72) Inventors: Jong-Young Hong, Suwon-si (KR); Hoon Song, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/034,923

(22) Filed: Sep. 28, 2020

(65) Prior Publication Data
US 2021/0318480 A1   Oct. 14, 2021

(30) Foreign Application Priority Data
Apr. 14, 2020   (KR) .......................... 10-2020-0045237

(51) Int. Cl.
*F21V 8/00*   (2006.01)

(52) U.S. Cl.
CPC .............. *G02B 6/003* (2013.01); *G02B 6/005* (2013.01); *G02B 6/0076* (2013.01)

(58) Field of Classification Search
CPC ...... G02B 6/003; G02B 6/005; G02B 6/0053; G02B 6/0056; G02B 6/0075;
(Continued)

(56) References Cited

U.S. PATENT DOCUMENTS

| 6,476,944 B1* | 11/2002 | Russa ...................... G02B 5/32 |
| | | 359/1 |
| 7,205,960 B2* | 4/2007 | David ................ G02B 27/4272 |
| | | 345/7 |

(Continued)

FOREIGN PATENT DOCUMENTS

| EP | 3 608 726 A1 | 2/2020 |
| KR | 10-2019-0083880 A | 7/2019 |

OTHER PUBLICATIONS

Communication dated Jun. 17, 2021, issued by the European Patent Office in European Application No. 21150291.9.

*Primary Examiner* — Tsion Tumebo
*Assistant Examiner* — James M Endo
(74) *Attorney, Agent, or Firm* — Sughrue Mion, PLLC

(57) ABSTRACT

An optical device includes a first backlight configured to output first light of a first wavelength through a first output coupler, a first lens disposed to face the first output coupler and having a focal length with respect to the first light, a second backlight including a second output coupler, the second backlight being configured to output second light of a second wavelength through the second output coupler, a second lens disposed to face the second output coupler and having different focal lengths with respect to the first light and the second light, a third backlight including a third output coupler, the third backlight being configured to output third light of a third wavelength through the third output coupler, and a third lens disposed to face the third output coupler and having different focal lengths with respect to the first light, the second light, and the third light.

23 Claims, 12 Drawing Sheets

(58) Field of Classification Search
CPC ........ G02B 6/0076; G02B 5/32; G02B 5/203;
G02B 27/0037; G02B 27/0103; G02B
27/005; G02B 27/0056; G02B 27/4216;
G02B 27/4211; G02B 2027/0174; G02B
2027/011; G02B 2027/0116
See application file for complete search history.

(56) References Cited

U.S. PATENT DOCUMENTS

| | | | |
|---|---|---|---|
| 2005/0185284 A1* | 8/2005 | Chen ................... | G02B 27/0025 359/642 |
| 2010/0118403 A1* | 5/2010 | Laitinen ............... | G02B 6/0076 359/567 |
| 2010/0220261 A1* | 9/2010 | Mizushima ....... | G02F 1/133615 349/64 |
| 2011/0242661 A1* | 10/2011 | Simmonds ......... | G02B 27/0101 359/567 |
| 2014/0016051 A1* | 1/2014 | Kroll ...................... | G02B 30/26 349/15 |
| 2015/0268399 A1 | 9/2015 | Futterer | |
| 2016/0011353 A1* | 1/2016 | Escuti .................. | G02B 5/3083 359/15 |
| 2017/0212348 A1* | 7/2017 | Fu ........................ | G02B 5/3083 |
| 2018/0017801 A1* | 1/2018 | Chang .................. | H04N 13/324 |
| 2018/0032030 A1* | 2/2018 | Kim ....................... | G02B 6/003 |
| 2018/0217395 A1* | 8/2018 | Lin ..................... | G02B 27/4272 |
| 2018/0267230 A1* | 9/2018 | Takagi .................. | G02F 1/0105 |
| 2018/0284460 A1 | 10/2018 | Cheng et al. | |
| 2018/0299678 A1* | 10/2018 | Singer .................. | G02B 5/1819 |
| 2018/0341111 A1* | 11/2018 | Karvonen ............ | G02B 6/0076 |
| 2018/0356639 A1* | 12/2018 | Schaefer ............. | G02B 27/017 |
| 2018/0372627 A1* | 12/2018 | Craig .................... | G01N 21/47 |
| 2019/0086683 A1* | 3/2019 | Aieta ...................... | G02B 1/002 |
| 2019/0212700 A1 | 7/2019 | An et al. | |

\* cited by examiner

OPTICAL DEVICE WITH REDUCED CHROMATIC ABERRATION AND DISPLAY DEVICE INCLUDING THE SAME

CROSS-REFERENCE TO RELATED APPLICATION

This application claims priority to Korean Patent Application No. 10-2020-0045237, filed on Apr. 14, 2020 in the Korean Intellectual Property Office, the disclosure of which is incorporated herein in its entirety by reference.

BACKGROUND

1. Field

Example embodiments of the present disclosure relate to optical devices with reduced chromatic aberration and display devices including the same.

2. Description of Related Art

Recently, holographic three-dimensional (3D) image display methods, which provide full parallax and are capable of making the depth perceived by the brain consistent with the focus of the eyes, have been gradually put to practical use.

According to such holographic display techniques, when light is radiated onto a hologram pattern having recorded thereon an interference pattern obtained by interference between reference light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. The spatial light modulator forms a hologram pattern and diffracts reference light from the light source according to an input CGH signal, thereby generating a 3D image.

In such a holographic display method, an optical element such as a field lens or a beam deflector may be used to display a holographic image formed by a spatial light modulator at a predetermined position. Such an optical element may be implemented based on diffraction. Diffraction elements have recently been used in many fields because diffraction elements may generate various optical effects and thin optical systems that may not be realized by using refractive elements of the related art. In addition, because such optical elements exhibit different refractive indices according to the wavelength of light, optical elements are accompanied by chromatic aberration, and in particular, when diffraction-based elements are used to reduce the volume of the elements, the performance difference according to the wavelengths further increases. Thus, there is a need for a method of preventing or reducing the chromatic aberration.

SUMMARY

One or more example embodiments provide optical devices with reduced chromatic aberration and display devices including the same.

Additional aspects will be set forth in part in the description which follows and, in part, will be apparent from the description, or may be learned by practice of example embodiments of the disclosure.

According to an aspect of an example embodiment, there is provided an optical device including a first backlight configured to output first light of a first wavelength through a first output coupler, a first lens disposed to face the first output coupler and having a predetermined focal length with respect to the first light of the first wavelength, a second backlight including a second output coupler disposed in parallel to the first output coupler, the second backlight being configured to output second light of a second wavelength through the second output coupler, a second lens disposed to face the second output coupler and having different focal lengths with respect to the first light of the first wavelength and the second light of the second wavelength, a third backlight including a third output coupler disposed in parallel to the second output coupler, the third backlight being configured to output third light of a third wavelength through the third output coupler, and a third lens disposed to face the third output coupler and having different focal lengths with respect to the first light of the first wavelength, the second light of the second wavelength, and the third light of the third wavelength.

The first lens, the second lens, and the third lens may be geometric phase lenses.

When a focal length of the first lens with respect to the first light of the first wavelength is $f1\_1$, focal lengths of the second lens with respect to the first light of the first wavelength and the second light of the second wavelength are $f2\_1$ and $f2\_2$, respectively, and focal lengths of the third lens with respect to the first light of the first wavelength, the second light of the second wavelength, and the third light of the third wavelength are $f3\_1$, $f3\_2$, and $f3\_3$, respectively, $EFL(f1\_1, f2\_1, \text{and } f3\_1)$ that is a combination focal length of $f1\_1$, $f2\_1$, and $f3\_1$ may satisfy the following condition: $|f3\_3 - EFL(f1\_1, f2\_1, f3\_1)|/f3\_3 < 0.0005$.

$EFL(f2\_2, f3\_2)$ that is a combination focal length of $f2\_2$ and $f3\_2$ may satisfy the following condition: $|f3\_3 - EFL(f2\_2, f3\_2)|/f3\_3 < 0.0005$.

The first lens, the second lens, and the third lens may operate with respect to light of a predetermined polarization, and the optical device may further include at least one phase retarder configured to cause incident light of the predetermined polarization to be incident on the first lens, the second lens, and the third lens.

According to another aspect of an example embodiment, there is provided an optical device including a first backlight configured to output first light of a first wavelength through a first output coupler, a first beam deflector disposed to face the first output coupler and configured to deflect the first light of the first wavelength at a predetermined angle, a second backlight including a second output coupler disposed in parallel to the first output coupler, the second backlight being configured to output second light of a second wavelength through the second output coupler, a second beam deflector disposed to face the second output coupler and configured to deflect the first light of the first wavelength and the second light of the second wavelength respectively at different angles, a third backlight including a third output coupler disposed in parallel to the second output coupler, the third backlight being configured to output third light of a third wavelength through the third output coupler, and a third beam deflector disposed to face the third output coupler and configured to deflect the first light of the first wavelength, the second light of the second wavelength, and the third light of the third wavelength respectively at different angles.

The first beam deflector, the second beam deflector, and the third beam deflector may be diffraction-based deflectors.

When an angle at which the first beam deflector deflects the first light of the first wavelength is a1_1, angles at which the second beam deflector deflects the first light of the first wavelength and the second light of the second wavelength are a2_1 and a2_2, respectively, and angles at which the third beam deflector deflects the first light of the first wavelength, the second light of the second wavelength, and the third light of the third wavelength are a3_1, a3_2, and a3_3, respectively, EDA(a1_1, a2_1, a3_1) that is a combination deflection angle of a1_1, a2_1, and a3_1 may satisfy the following condition: |a3_3−EDA(a1_1, a2_1, a3_1)|/a3_3<0.0005.

EDA(a2_2, a3_2) that is a combination deflection angle of a2_2 and a3_2 may satisfy the following condition: |a3_3−EDA(a2_2, a3_2)|/a3_3<0.0005.

A display device may include the optical device, and a spatial light modulator configured to generate a hologram image by modulating the first light output from the first backlight, the second light output from the second backlight, and third light output from the third backlight.

The first backlight may include a first light source configured to emit the first light of the first wavelength, and a first light guide plate including a first input coupler on which the first light from the first light source is incident and the first output coupler, the second backlight may include a second light source configured to emit the second light of the second wavelength, and a second light guide plate including a second input coupler on which the second light from the second light source is incident and the second output coupler, and the third backlight may include a third light source configured to emit the third light of the third wavelength, and a third light guide plate including a third input coupler on which the third light from the third light source is incident and the third output coupler.

The first lens, the second lens, and the third lens may be geometric phase lenses.

When a focal length of the first lens with respect to the first light of the first wavelength is f1_1, focal lengths of the second lens with respect to the first light of the first wavelength and the second light of the second wavelength are f2_1 and f2_2, respectively, and focal lengths of the third lens with respect to the first light of the first wavelength, the second light of the second wavelength, and the third light of the third wavelength are f3_1, f3_2, and f3_3, respectively, EFL (f1_1, f2_1, and f3_1) that is a combination focal length of f1_1, f2_1, and f3_1 may satisfy the following condition: |f3_3−EFL(f1_1, f2_1, f3_1)|/f3_3<0.0005.

EFL(f2_2, f3_2) that is a combination focal length of f2_2 and f3_2 may satisfy the following condition: |f3_3−EFL(f2_2, f3_2)|/f3_3<0.0005.

The display device may further include a beam deflector configured to adjust a position of a hologram image generated by the spatial light modulator.

The display device may further include a first beam deflector disposed between the first output coupler and the second output coupler and configured to deflect the first light of the first wavelength at a predetermined angle, a second beam deflector disposed between the second output coupler and the third output coupler and configured to deflect the first light of the first wavelength and the second light of the second wavelength respectively at different angles, and a third beam deflector disposed such that the first light, the second light, and the third light output from the third output coupler is incident on the third beam deflector, the third beam deflector being configured to deflect the first light of the first wavelength, the second light of the second wavelength, and the third light of the third wavelength respectively at different angles.

The first beam deflector, the second beam deflector, and the third beam deflector may be diffraction-based deflectors.

When an angle at which the first beam deflector deflects the first light of the first wavelength is a1_1, angles at which the second beam deflector deflects the first light of the first wavelength and the second light of the second wavelength are a2_1 and a2_2, respectively, and angles at which the third beam deflector deflects the first light of the first wavelength, the second light of the second wavelength, and the third light of the third wavelength are a3_1, a3_2, and a3_3, respectively, EDA(a1_1, a2_1, a3_1) that is a combination deflection angle of a1_1, a2_1, and a3_1 may satisfy the following condition: |a3_3−EDA(a1_1, a2_1, a3_1)|/a3_3<0.0005.

EDA(a2_2, a3_2) that is a combination deflection angle of a2_2 and a3_2 may satisfy the following condition: |a3_3−EDA(a2_2, a3_2)|/a3_3<0.0005.

The first beam deflector, the second beam deflector, and the third beam deflector may be electrically controlled to adjust a direction in which incident light is deflected.

The display device may further include an eye tracking sensor, wherein the first beam deflector, the second beam deflector, and the third beam deflector may be controlled based on a signal sensed by the eye tracking sensor.

A display device may include the optical device and a spatial light modulator configured to generate a hologram image by modulating the first light of the first wavelength output from the first backlight, the second light of the second wavelength output from second backlight, and the third light of the third wavelength output from the third backlight, and a field lens configured to focus the hologram image generated by the spatial light modulator at a predetermined position.

The first beam deflector, the second beam deflector, and the third beam deflector may be electrically controlled to adjust a direction in which incident light is deflected.

The display device may further include an eye tracking sensor, wherein the first beam deflector, the second beam deflector, and the third beam deflector may be controlled based on a signal sensed by the eye tracking sensor.

According to yet another aspect of an example embodiment, there is provided an optical device including a first backlight including a first light source configured to emit a first light of a first wavelength and a first light guide plate that includes a first input coupler facing the first light source and a first output coupler, the first backlight being configured to output the first light of the first wavelength through a first output coupler, a first lens disposed to face the first output coupler and having a predetermined focal length with respect to the first light of the first wavelength, a second backlight including a second light source configured to emit a second light of a second wavelength and a second light guide plate that includes a second input coupler facing the second light source and a second output coupler, the second backlight being configured to output the second light of the second wavelength through a second output coupler, a second lens disposed to face the second output coupler and having different focal lengths with respect to the first light of the first wavelength and the second light of the second wavelength, a third backlight including a third light source configured to emit a third light of a third wavelength and a third light guide plate that includes a third input coupler facing the third light source and a third output coupler, the third backlight being configured to output the third light of the third wavelength through a third output coupler, and a third lens disposed to face the third output coupler and having different focal lengths with respect to the first light of the first wavelength, the second light of the second wavelength, and the third light of the third wavelength.

BRIEF DESCRIPTION OF THE DRAWINGS

The above and/or other aspects, features, and advantages of certain example embodiments of the disclosure will be more apparent from the following description taken in conjunction with the accompanying drawings, in which.

DETAILED DESCRIPTION

Figure 1:
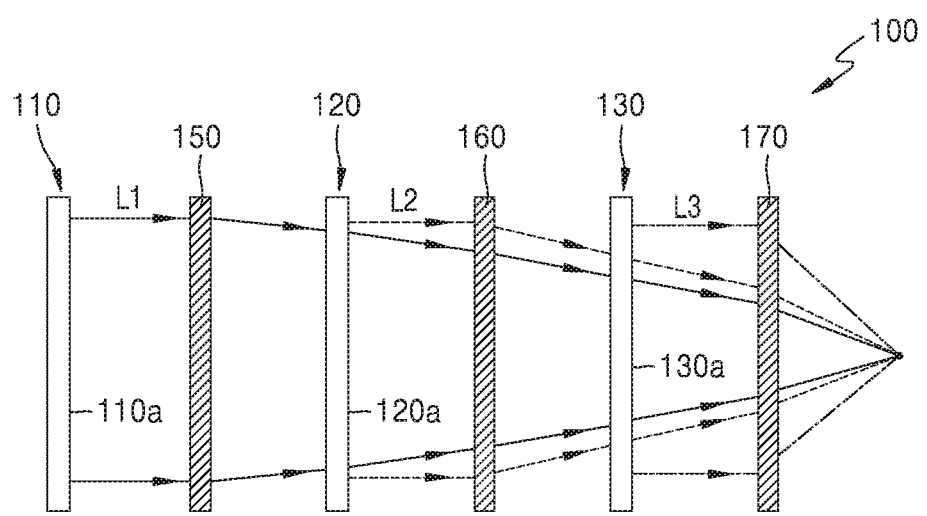
FIG. 1 illustrates a schematic configuration and an optical arrangement of an optical device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, with reference to the accompanying drawings, example embodiments will be described in detail. The embodiments described below are merely examples, and various modifications may be possible from the embodiments. Like reference numerals refer to like elements throughout, and in the drawings, sizes of elements may be exaggerated for clarity and convenience of explanation.

Hereinafter, an expression "above" or "on" may include not only immediately on in a contact manner but also on in a non-contact manner.

Terms such as first and second may be used to describe various elements, but are used only for the purpose of distinguishing one element from other elements. These terms do not limit differences in the material or structure of the elements.

The expression of singularity in the present disclosure includes the expression of plurality unless clearly specified otherwise in context. Also, terms such as "comprise" and/or "comprising" may be construed to denote an element, but may not be construed to exclude the existence of or a possibility of addition of another element.

The term used in the embodiments such as "unit" or "module" indicates a unit for processing at least one function or operation, and may be implemented in hardware, software, or in a combination of hardware and software.

The use of the terms "a" and "an" and "the" and similar referents in the context of describing the disclosure are to be construed to cover both the singular and the plural.

Also, operations of all methods described herein may be performed in any suitable order unless otherwise indicated herein or otherwise clearly contradicted by context. The use of any and all examples, or language (e.g., "such as") provided herein, is intended merely to better illuminate the disclosure and does not pose a limitation on the scope of the disclosure unless otherwise claimed.

Figure 2:
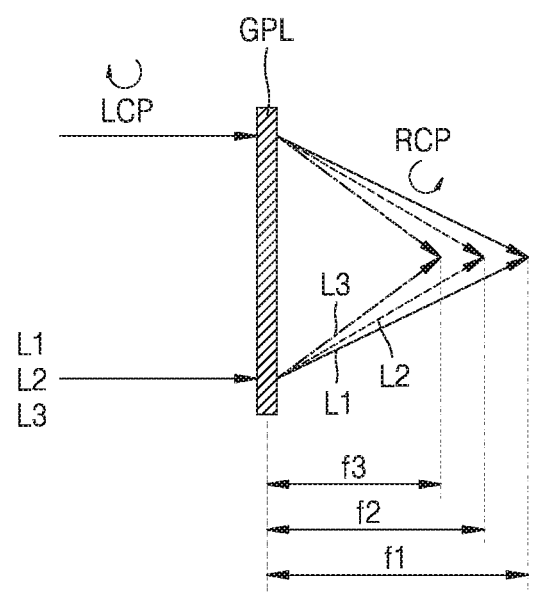
FIG. 2 illustrates a conceptual focusing operation of a geometric phase lens that may be employed in the optical device of FIG. 1.

FIG. 1 illustrates a schematic configuration and an optical arrangement of an optical device 100 according to an example embodiment, and FIG. 2 illustrates a conceptual focusing operation of a geometric phase lens GPL that may be employed in the optical device 100 of FIG. 1.

The optical device 100 according to the example embodiment has a reduced chromatic aberration and focuses light of different wavelengths.

The optical device 100 includes a first backlight 110 outputting light L1 of a first wavelength, a first lens 150 having a predetermined focal length with respect to the light L1 of the first wavelength emitted from the first backlight 110, a second backlight 120 outputting light L2 of a second wavelength, a second lens 160 exhibiting different focal lengths with respect to the light L1 of the first wavelength and the light L2 of the second wavelength, and a third backlight 130 outputting light L3 of a third wavelength, and a third lens 170 exhibiting different focal lengths with respect to the light L1 of the first wavelength, the light L2 of the second wavelength, and the light L3 of the third wavelength.

The light L1 of the first wavelength, the light L2 of the second wavelength, and the light L3 of the third wavelength are light in the wavelength range of visible light, and may be blue light, green light, and red light, respectively, but are not limited thereto.

The first backlight 110, the second backlight 120, and the third backlight 130 are provided with a first emission surface 110a, a second emission surface 120a, and a third emission surface 130a respectively that emit light toward the first lens 150, the second lens 160, and the third lens 170. The first backlight 110, the second backlight 120, and the third backlight 130 are configured such that the first emission surface 110a, the second lens 160, the second emission surface 120a, the second lens 160, the third emission surface 130a, and the third lens 170 are disposed in parallel with each other. An output coupler for light emission may be formed on each of the first emission surface 110a, the second emission surface 120a, and the third emission surface 130a.

As illustrated in FIG. 2, the first lens 150, the second lens 160, and the third lens 170 may be the geometric phase lens GPL. The geometric phase lens GPL may be implemented in, for example, a liquid crystal device or a meta device, and may include a micro-patterned structure. The geometric phase lens GPL is designed to have a predetermined refractive power by modulating the phase of an incidence light differently according to the position. For example, when light of a left-handed circular polarization LCP is incident, the light may be focused with phase modulation to light of a right-handed circular polarization RCP. However, embodiments are not limited thereto. For example, when the incident light is focused, the light of the right-handed circular polarization RCP may be modulated to the light of the left-handed circular polarization LCP, or the incidence light may be modulated based on linear polarization. In addition, although a positive refractive power is illustrated, the geometric phase lens GPL may be designed to exhibit negative refractive power, such as a concave lens. The geometric phase lens GPL may have a flat plate shape and implement a desired refractive power with a relatively small thickness.

However, because the geometric phase lens GPL adjusts a direction in which light travels through phase modulation, as illustrated in FIG. 2, the geometric phase lens GPL may show different focal lengths according to the wavelength of the incidence light. For example, the geometric phase lens GPL designed to have a first focal length f1 with respect to the light L1 of the first wavelength exhibits a second focal length f2 different from the first focal length f1 with respect to the light L2 of the second wavelength, and a third focal length f3 different from the first focal length f1 and the second focal length f2 with respect to the light L3 of the third wavelength. A focal length may be inversely proportional to the wavelength of the incidence light. For example, the geometric phase lens GPL exhibits a focal length shorter than the designed focal length when light having a wavelength longer than the designed wavelength is incident, and a focal length longer than the designed focal length when light having a wavelength shorter than the designed wavelength is incident. The properties of the geometric phase lens GPL may be represented by chromatic aberration.

In the optical device 100 according to the example embodiment, details and arrangement positions of the first lens 150, the second lens 160, and the third lens 170 are set such that the light L1, L2, and L3 of different wavelengths may be focused on the same position.

The light L1 of the first wavelength is focused through the first lens 150, the second lens 160, and the third lens 170, the light L2 of the second wavelength is focused through the second lens 160 and the third lens 170, and the light L3 of the third wavelength is focused through the third lens 170. According to such optical paths, the light L1, L2, and L3 of different wavelengths may be focused on substantially the same location, and chromatic aberration may be reduced or prevented.

A focal length of the first lens 150 with respect to the light L1 of the first wavelength may be f1_1, focal lengths of the second lens 160 with respect to the light L1 of the first wavelength and the light L2 of the second wavelength may be f2_1 and f2_2, respectively, and focal lengths of the third lens 170 with respect to the light L1 of the first wavelength, the light L2 of the second wavelength, and the light L3 of the third wavelength may be f3_1, f3_2, and f3_3, respectively. For example, f2_1 and f2_2 may be different numerical values, and f3_1, f3_2, and f3_3 may also be different numerical values.

In the optical device 100 of the example embodiment, the first lens 150, the second lens 160, and the third lens 170 may be set such that the effective focal length EFL (f1_1, f2_1, and f3_1) that is a combination focal length of f1_1, f2_1, and f3_1 and the EFL (f2_2, f3_2) that is a combination focal length of f2_2 and f3_2 are substantially the same as the focal length f3_3 with respect to the light L3 of the third wavelength of the third lens 170.

A combination focal length EFL of two lenses having focal lengths $f_1$ and $f_2$ and a distance d between the centers may be obtained as shown in Equation 1.

$$EFL = \frac{f_1 * f_2}{f_1 + f_2 - d} \qquad \text{[Equation 1]}$$

A combination focal length EFL of three lenses having the focal lengths of $f_1$, $f_2$, and $f_3$ and distances $d_{12}$ and $d_{23}$ between the centers of adjacent lenses may be obtained as shown in Equation 2.

$$EFL = \frac{\frac{f_1 * f_2}{f_1 + f_2 - d_{12}} * f_3}{\frac{f_1 * f_2}{f_1 + f_2 - d_{12}} + f_3 - d_{23}} \qquad \text{[Equation 2]}$$

Considering the above equations and requirements that will be described later, details of the first lens 150, the second lens 160, and the third lens 170, that is, focal lengths with respect to light of different wavelengths and arrangement spaces thereof may be set.

The first lens 150, the second lens 160, and the third lens 170 may satisfy the following condition in Equation 3.

$$EFL(f1\_1, f2\_1, f3\_1) = EFL(f2\_2, f3\_2) = f3\_3 \qquad \text{[Equation 3]}$$

However, embodiments are not limited thereto, and the difference between the values may be set within a predetermined range such that the optical device 100 has little chromatic aberration or a small value within a desired range.

For example, the first lens 150, the second lens 160, and the third lens 170 may satisfy the following conditions in Equation 4 and Equation 5.

$$|f3\_3 - EFL(f1\_1, f2\_1, f3\_1)|/f3\_3 < 0.0005 \qquad \text{[Equation 4]}$$

$$|f3\_3 - EFL(f2\_2, f3\_2)|/f3\_3 < 0.0005 \qquad \text{[Equation 5]}$$

Figure 3:
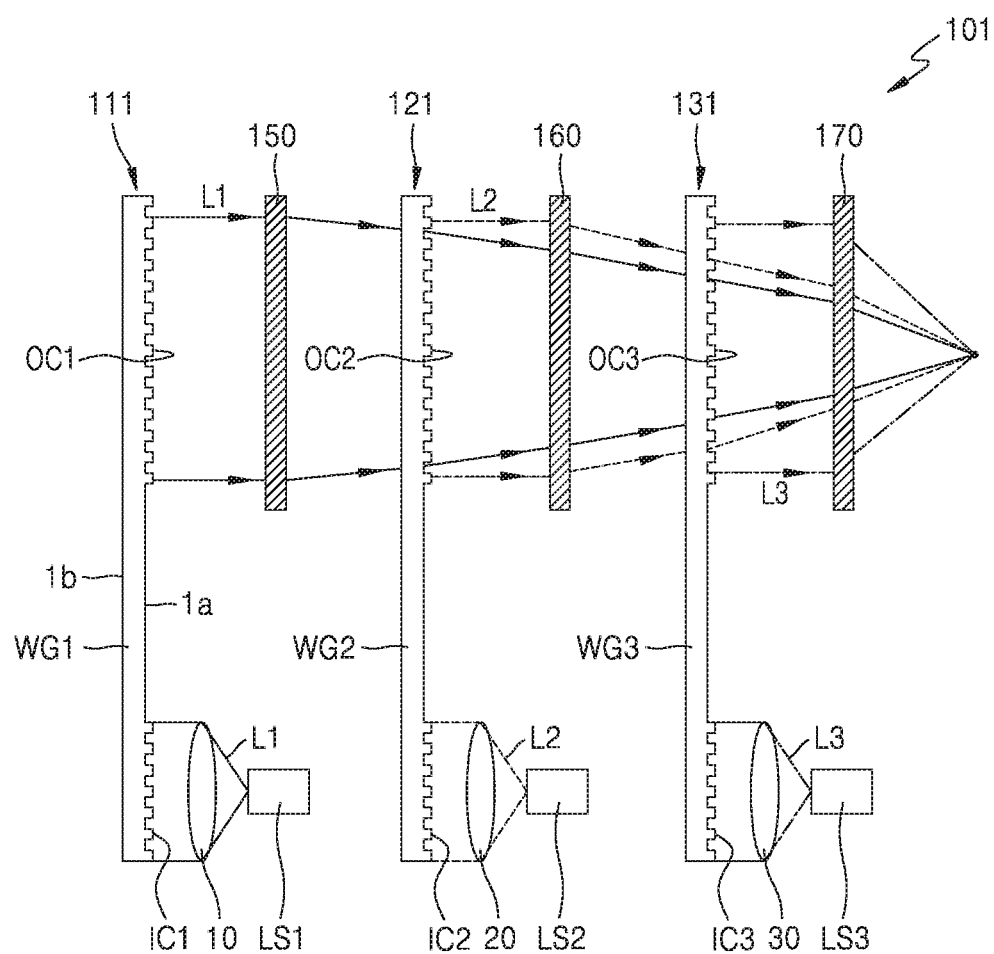
FIG. 3 illustrates a schematic configuration and optical arrangement of an optical device according to another example embodiment.

FIG. 3 illustrates a schematic configuration and optical arrangement of an optical device 101 according to another example embodiment.

The optical device 101 includes a first backlight 111, a first lens 150, a second backlight 121, a second lens 160, a third backlight 131 and a third lens 170.

The optical device 101 of the example embodiment is different from the optical device 100 of FIG. 1 in that detailed configurations of the first backlight 111, the second backlight 121, and the third backlight 131 are illustrated and the configurations of the first lens 150, the second lens 160, and the third lens 170 are substantially the same as that of the optical device 100 of FIG. 1.

The first backlight 111 includes a first light source LS1 providing the light L1 of the first wavelength, and a first light guide plate WG1 guiding and emitting the light L1 of the first light source LS1 in a direction toward the first lens 150. The first light guide plate WG1 includes a first input coupler 101 causing the light L1 of the first light source LS1 to be incident and a first output coupler OC1 emitting the light L1 input through the first input coupler 101 toward the first lens 150. Between the first light source LS1 and the first light guide plate WG1, a collimating lens 10 that collimates the light from the first light source LS1 such that the light is incident parallel to the first input coupler 101 is further disposed.

The first light source LS1 may be a coherent light source that emits coherent light, and may be, for example, a laser diode (LD) or a light emitting diode (LED).

The first light guide plate WG1 serves as an optical waveguide transmitting light, and may include a material that is transparent to visible light, such as glass, poly methyl methacrylate (PMMA), or polydimethylsiloxane (PDMS). The first light guide plate WG1 includes two surfaces 1a and 1b facing each other, and includes the first input coupler 101 for inducing the light incident from the first light source LS1 into the first light guide plate WG1 and the first output coupler OC1 for outputting light that is totally reflected from the two surfaces 1a and 1b inside the first light guide plate WG1 and travels to the outside of the first light guide plate WG1. For example, the first input coupler IC1 may be disposed on one edge of the surface 1a of the first light guide plate WG1, and the first output coupler OC1 may be disposed on the other edge of the surface 1a of the first light guide plate 120.

The first input coupler IC1 is configured to guide light incident on the first input coupler IC1 in a direction approximately normal to the surface 1a of the first light guide plate WG1 in an oblique direction. For example, the first input coupler 101 may be configured to guide the light incident on the first input coupler 101 within a predetermined angle of incidence with respect to a direction perpendicular to its surface to the inside of the first light guide plate WG1. The light guided to the inside of the first light guide plate WG1 is totally reflected on the two surfaces 1a and 1b the first light guide plate WG1 that face each other repeatedly and travels along the inside of the first light guide plate WG1. The first output coupler OC1 is configured to output light obliquely incident on the first output coupler OC1 in a direction approximately normal to the surface 1a of the first light guide plate WG1. The first output coupler OC1 may be configured to guide only light incident within a predetermined range of an incidence angle, and not guide light incident at other ranges of angle. For example, the first output coupler OC1 may simply act as a transparent plate with respect to light incident at an angle different from the set condition.

The first input coupler 101 and the first output coupler OC1 may be formed in a diffractive optical element (DOE) or a holographic optical element (HOE). The DOE may include a plurality of periodic fine grating patterns. The plurality of grating patterns of the DOE serves as a diffraction grating to diffract an incidence light. In particular, according to the size, height, period, etc. of the grating patterns, the travel direction of the light may change by diffracting light incident in a specific angle range and generating extinctive interference and constructive interference. In addition, the HOE may include periodic fine patterns of materials with different refractive indices instead of a grating pattern. The HOE merely differs from the DOE only in the configuration, and may have a same operation principle as an operating principle of the DOE.

In the configuration of the first light guide plate WG1, the light incident on the input coupler 101 is output to the outside of the light guide plate 120 through the output coupler OC1. In addition, the directionality and coherence of light incident on the input coupler 101 and output through the output coupler OC1 may be maintained within an angular range coupled by the input coupler 101.

Similarly, the second backlight 121 includes a second light source LS2 providing the light L2 of the second wavelength and a second light guide plate WG2 guiding and emitting the light L2 of the second light source LS2 in a direction toward the second lens 160 and including a second input coupler 102 and a second output coupler OC2. In addition, a collimating lens 20 may be disposed between the second light source LS2 and the second light guide plate WG2. The second output coupler OC2 may act as a transparent plate with respect to the light L1 of the first wavelength and emit the light L2 of the second wavelength in a direction normal to the surface of the second light guide plate WG2.

In addition, the third backlight 131 includes a third light source LS3 providing the light L3 of the third wavelength and a third light guide plate WG3 guiding and emitting the light L3 of the third light source LS3 in a direction toward the third lens 170 and including a third input coupler 103 and a third output coupler OC3. Also, a collimating lens 30 may be disposed between the third light source LS3 and the third light guide plate WG3. The third output coupler OC3 may act as a transparent plate with respect to the light L1 of the first wavelength and the light L2 of the second wavelength, and emit the light L3 of the third wavelength in a direction normal to a surface of the third light guide plate WG3.

As described above, the light L1 of the first wavelength forms an optical path in the order of the first output coupler OC1, the first lens 150, the second output coupler OC2, the second lens 160, the third output coupler OC3, and the third lens 170. The light L2 of the second wavelength forms an optical path in the order of the second output coupler OC2, the second lens 160, the third output coupler OC3, and the third lens 170. The light L3 of the third wavelength forms an optical path in the order of the third output coupler OC3 and the third lens 170. The light L1 of the first wavelength, the light L2 of the second wavelength, and the light L3 of the third wavelength may be focused on the same position with little or no chromatic aberration according to the focal length requirements designed by the first lens 150, the second lens 160, and the third lens 170 with respect to light of each wavelength.

Figure 4:
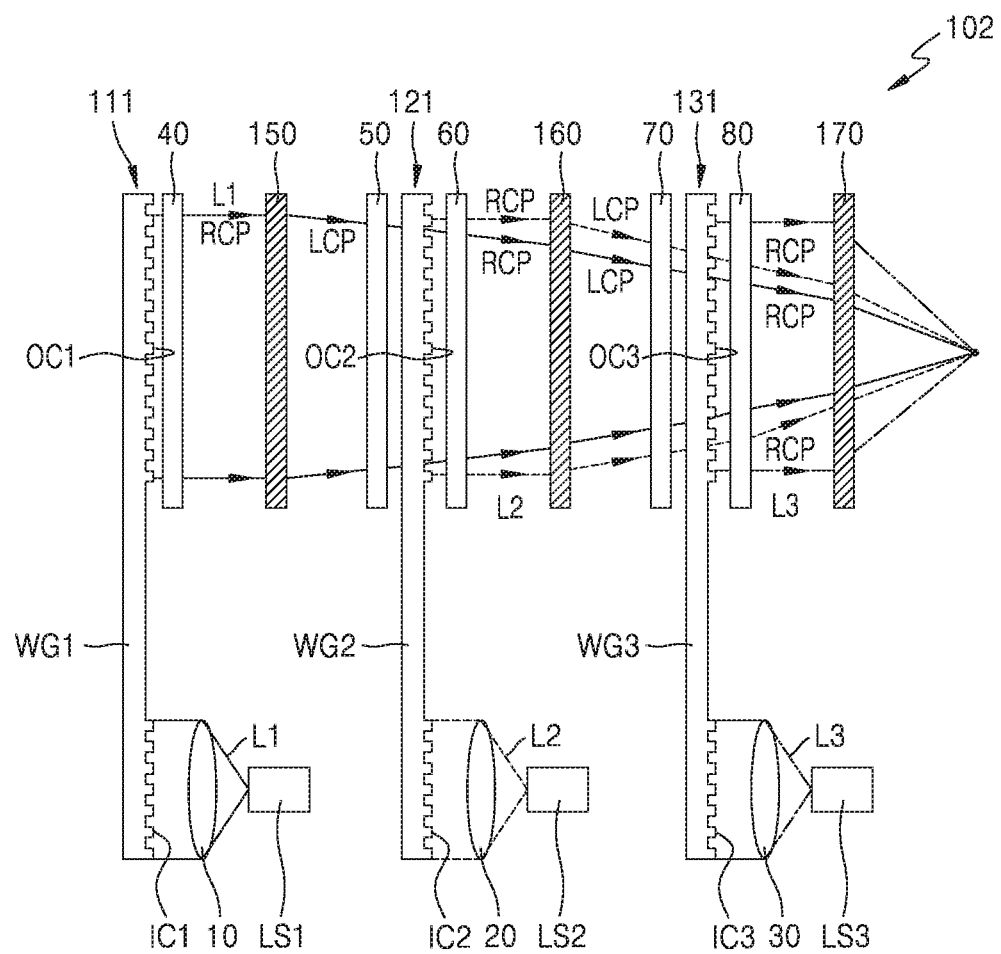
FIG. 4 illustrates a schematic configuration and optical arrangement of an optical device according to another example embodiment.

FIG. 4 illustrates a schematic configuration and optical arrangement of an optical device 102 according to another example embodiment.

The optical device 102 of the example embodiment differs from the optical device 101 of FIG. 3 in that the optical device 102 further includes additional optical elements to control polarization of light incident on the first lens 150, the second lens 160, and the third lens 170.

As described above, the first lens 150, the second lens 160, and the third lens 170, which are geometric phase lenses, may act on light of a predetermined polarization, and accordingly, the optical device 102 of the example embodiment further includes one or more phase retarders that cause the light of the predetermined polarization to be incident on the first lens 150, the second lens 160, and the third lens 170.

The first lens 150, the second lens 160, and the third lens 170 may focus the light of the right-handed circular polarization RCP, and may change the right-handed circular polarization RCP to the left-handed circular polarization LOP. For this operation, a ¼ wave plate 40 may be disposed between the first backlight 111 and the first lens 150, and further, a ¼ wave plate 50 may be disposed between the first lens 150 and the second backlight 121. In addition, ¼ wave plates 60, 70, and 80 may be disposed respectively between the second backlight 121 and the second lens 160, between the second lens 160 and the third backlight 131 and between the third backlight 131 and the third lens 170.

The first backlight 111 may be configured to emit light of a linear polarization, and the light L1 of the first wavelength emitted from the first backlight 111 passes through the ¼ wave plate 40 and changes in the polarization state to the right-handed circular polarization RCP to be incident on the first lens 150. The light L1 of the first wavelength changed to the left-handed circular polarization LCP and refracted according to a predetermined refractive power in the first lens 150 passes through the ¼ wave plate 50 again and changes in the polarization state to linear polarization.

The light L1 of the first wavelength in the state of linear polarization and the light L2 of the second wavelength in the state of linear polarization emitted from the second backlight 121 pass through the ¼ wavelength plate 60 and change to the state of the right-handed circular polarization RCP to be incident on the second lens 160. Next, the light L1 of the first wavelength and the light L2 of the second wavelength pass through the second lens 160, are refracted according to predetermined certain refractive powers, and change to the state of the left-handed circular polarization LOP. The light L1 of the first wavelength in the state of linear polarization and the light L2 of the second wavelength in the state of the left-handed circular polarization LCP pass through the ¼ wave plate 70 again, and change in the polarization state to linear polarization.

The light L1 of the first wavelength and the light L2 of the second wavelength in the state of linear polarization, and the light L3 of the third wavelength in the state of linear polarization emitted from the third backlight 131 pass through the ¼ wavelength plate 80 and change to the state of the right-handed circular polarization RCP to be incident on the third lens 170. Next, the light L1 of the first wavelength, the light L2 of the second wavelength, and the light L3 of the third wavelength pass through the third lens 170, and are refracted according to predetermined certain refractive powers.

In the above description, the first lens 150, the second lens 160, and the third lens 170 act on circular polarization and an additional phase retarder is a ¼ wavelength plate, but embodiments are not limited thereto. Depending on the polarization requirements of the first lens 150, the second lens 160, and the third lens 170, other components may be used or additional components may be added.

Figure 5:
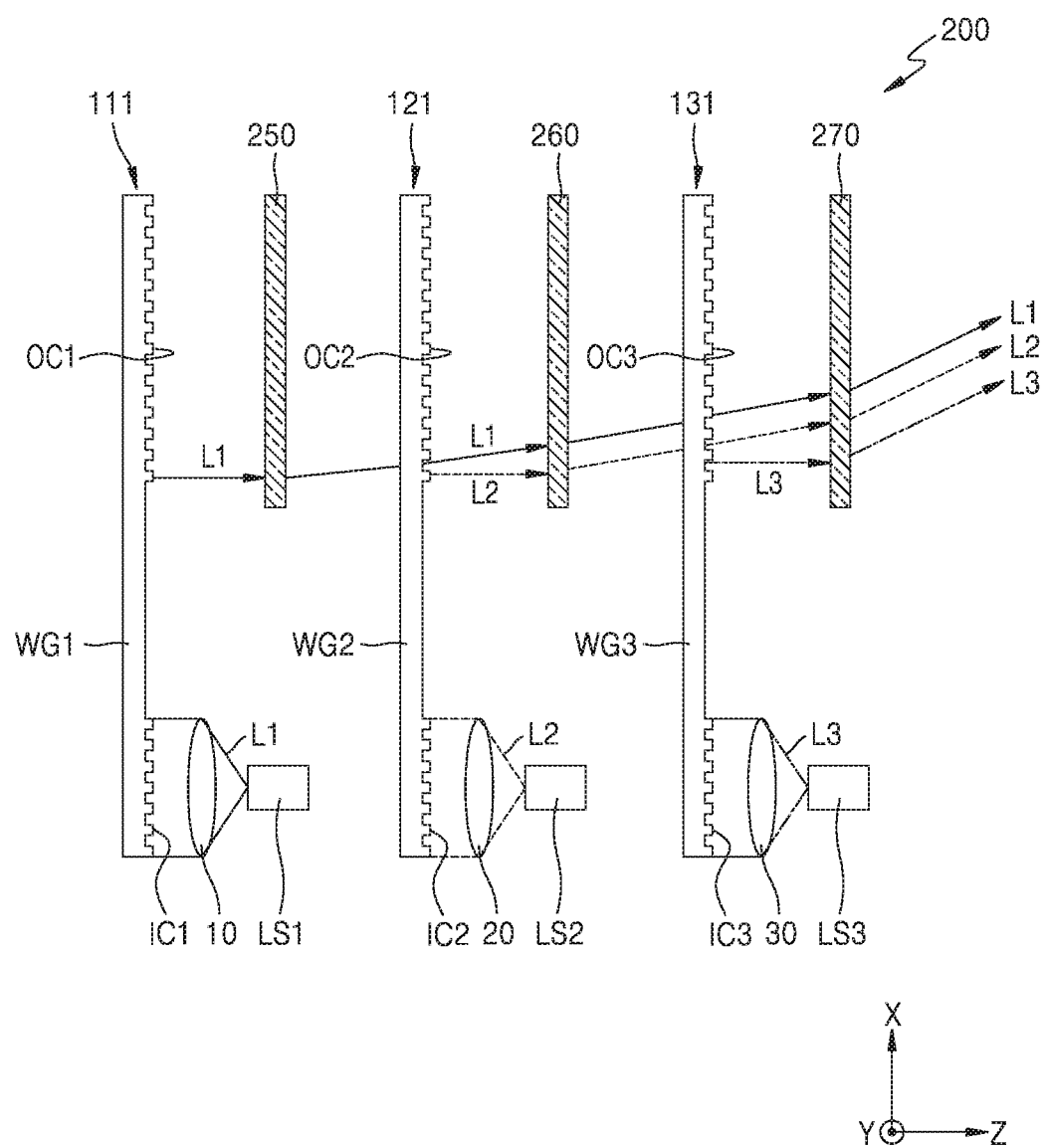
FIG. 5 illustrates a schematic configuration and optical arrangement of an optical device according to another embodiment.
Figure 6:
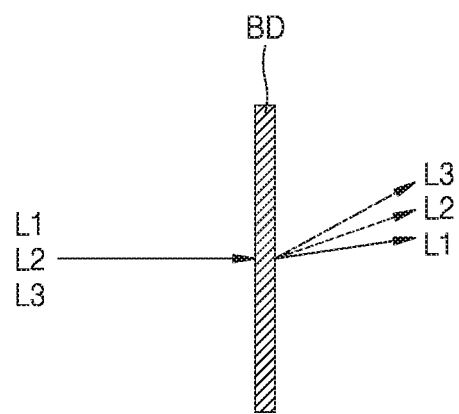
FIG. 6 illustrates an optical operation of a diffraction-based beam deflector that may be employed in the optical device of FIG. 5.

FIG. 5 illustrates a schematic configuration and optical arrangement of an optical device 200 according to another example embodiment, and FIG. 6 illustrates a conceptual optical operation of a diffraction-based beam deflector BD that may be employed in the optical device 200 of FIG. 5.

The optical device 200 of the example embodiment is a beam deflecting device that exhibits reduced chromatic aberration and deflects light of different wavelengths.

The optical device 200 includes a first backlight 111 outputting the light L1 of the first wavelength, a first beam deflector 250 deflecting the light L1 of the first wavelength at a predetermined angle, a second backlight 121 outputting the light L2 of the second wavelength, a second beam deflector 260 deflecting the light L1 of the first wavelength and the light L2 of the second wavelength at different angles, a third backlight 131 outputting the light L3 of the third wavelength, and a third beam deflector 270 deflecting the light L1 of the first wavelength, the light L2 of the second wavelength, and the light L3 of the third wavelength at different angles.

The first backlight 111, the second backlight 121, and the third backlight 131 have the configurations described in the above-described example embodiments, and the first output coupler OC1, the first beam deflector 250, the second output coupler OC2, the second beam deflector 260, the third output coupler OC3, and the third beam deflector 270 are sequentially arranged in parallel with each other.

The first beam deflector 250, the second beam deflector 260, and the third beam deflector 270 are diffraction-based beam deflectors BD as illustrated in FIG. 6. The beam deflector BD may be a diffraction element including liquid crystal or an optical element that may electrically change phase. The beam deflector BD may be implemented in a geometric phase manner, or may be implemented as a meta element including a micro-patterned structure. The beam deflector BD is designed to differently modulate the phase of the incidence light according to the position to deflect the direction of the incidence light at a predetermined angle. Because such a method adjusts the direction in which light travels through phase modulation, as illustrated in FIG. 6, light may be deflected at different angles according to the wavelength of incidence light. For example, the first beam deflector 250 designed to have a first deflection angle with respect to the light L1 of the first wavelength may exhibit a second deflection angle different from the first deflection angle with respect to the light L2 of the second wavelength, and in addition, show a third deflection angle different from the first deflection angle and the second deflection angle with respect to the light L3 of the third wavelength. When light having a wavelength different from a designed wavelength is incident on the diffraction-based beam deflector BD, the light may be deflected at a different angle from a designed deflection angle, which may be represented by chromatic aberration.

In the optical device 200 according to the example embodiment, details and arrangement positions of the first beam deflector 250, the second beam deflector 260, and the third beam deflector 270 are set such that the light L1, L2, and L3 of different wavelengths may be deflected in the same direction by the optical device 200.

The light L1 of the first wavelength is deflected at a predetermined angle through each of the first beam deflector 250, the second beam deflector 260, and the third beam deflector 270, the light L2 of the second wavelength is deflected through the second beam deflector 260 and the third beam deflector 270, and the light L3 of the third wavelength is deflected through the third beam deflector 270. According to such optical paths, the light L1, L2, and L3 of different wavelengths may be deflected in substantially the same direction, and chromatic aberration may rarely appear.

An angle at which the first beam deflector 250 deflects the light L1 of the first wavelength may be $a1\_1$, angles at which the second beam deflector 260 deflects the light L1 of the first wavelength and the light L2 of the second wavelength may be $a2\_1$ and $a2\_2$, respectively, and angles at which the third beam deflector 270 deflects the light L1 of the first wavelength, the light L2 of the second wavelength, and the light L3 of the third wavelength may be $a3\_1$, $a3\_2$, and $a3\_3$, respectively. For example, $a2\_1$ and $a2\_2$ may be different numerical values, and a3_1, a3_2, and a3_3 may also be different numerical values.

The first beam deflector 250, the second beam deflector 260, and the third beam deflector 270 may be also electrically controlled and may adjust the direction in which light is deflected in detail. For example, the above numerical values can be adjusted in a predetermined range.

In the optical device 200 of the example embodiment, the first beam deflector 250, the second beam deflector 260, and the third beam deflector 270 may be set such that a combination deflection angle EDA(a1_1, a2_1, a3_1) of a1_1, a2_1, and a3_1 and a combination deflection angle EDA (a2_2, a3_2) of a2_2 and a3_2 are substantially the same as the deflection angle a3_3 with respect to the light L3 of the third wavelength of the third beam deflector 270.

The first beam deflector 250, the second beam deflector 260, and the third beam deflector 270 may satisfy the following condition in Equation 6.

$$EDA(a1\_1, a2\_1, a3\_1) = EDA(a2\_2, a3\_2) = a3\_3 \quad \text{[Equation 6]}$$

However, embodiments are not limited thereto, and the difference between the values may be set within a predetermined range such that the optical device 200 has little direction deviation depending on the wavelength or a small value within a desired range.

For example, the first beam deflector 250, the second beam deflector 260, and the third beam deflector 270 may satisfy the following conditions in Equation 7 and Equation 8.

$$|a3\_3 - EDA(a1\_1, a2\_1, a3\_1)|/a3\_3 < 0.0005 \quad \text{[Equation 7]}$$

$$|a3\_3 - EDA(a2\_2, a3\_2)|/a3\_3 < 0.0005 \quad \text{[Equation 8]}$$

The above-described deflection angles are formed with the Z axis on the XZ plane, but are not limited thereto. The first beam deflector 250, the second beam deflector 260, and the third beam deflector 270 may be set such that the deflection angle may be set to be defined as an angle formed with Z in the YZ plane and may be defined on another plane.

Figure 7:
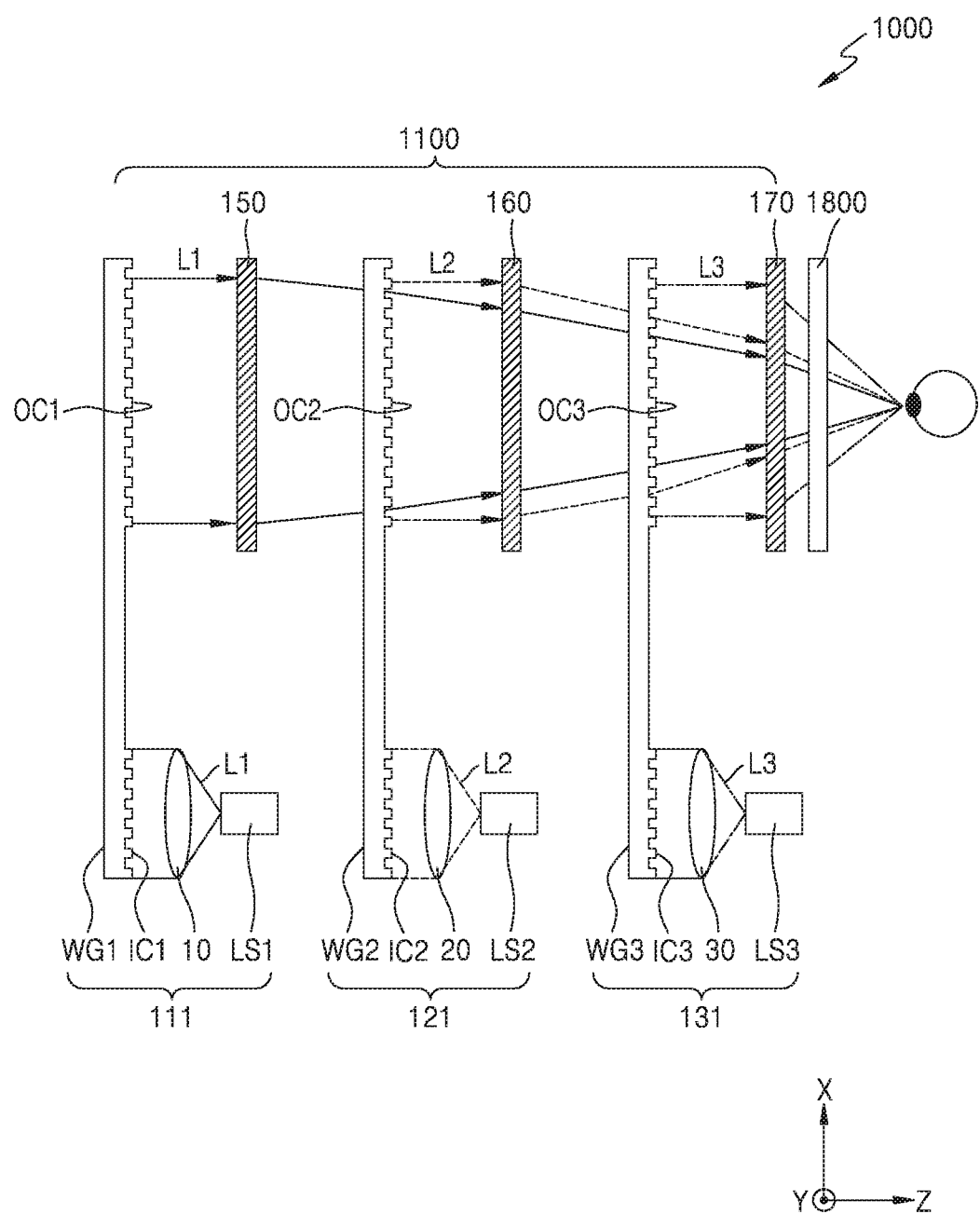
FIG. 7 illustrates a schematic configuration and an optical arrangement of a display device according to an example embodiment.

FIG. 7 illustrates a schematic configuration and an optical arrangement of a display device 1000 according to an example embodiment.

The display device 1000 includes an optical device 1100 and a spatial light modulator 1800.

The optical device 1100 may have low chromatic aberration and provide light focused on a predetermined position to the spatial light modulator 1800, for example, and may have a configuration substantially the same as or modified from the optical device 101 illustrated in FIG. 3.

The spatial light modulator 1800 modulates light from the first backlight 111, the second backlight 121, and the third backlight 131 of the optical device 1100 to generate a hologram image.

The spatial light modulator 1800 may form a hologram pattern according to a hologram data signal, for example, a computer generated hologram (CGH) signal, provided from a controller. After the light from the first backlight 111, the second backlight 121, and the third backlight 131 is incident on the spatial light modulator 1800 and is diffracted by the hologram pattern formed on the spatial light modulator 1800, a holographic image having a stereoscopic effect may be reproduced by extinctive interference and constructive interference. The spatial light modulator 1800 may use any of a phase modulator capable of performing only phase modulation, an amplitude modulator capable of performing only amplitude modulation, and a complex modulator capable of performing both phase modulation and amplitude modulation. As the spatial light modulator 1800, a liquid crystal on silicon (LCoS), a digital micromirror device (DMD), or a semiconductor modulator may be used.

In FIG. 7, the light passing through all of the first lens 150, the second lens 160, and the third lens 170 is incident on the spatial light modulator 1800, but embodiments are not limited thereto. For example, the positions of the third lens 170 and the spatial light modulator 1800 may be switched.

In the display device 1000, the light focused on a predetermined position by the optical device 1100 without chromatic aberration is provided to the spatial light modulator 1800, thereby providing an observer with a good quality holographic image.

Figure 8:
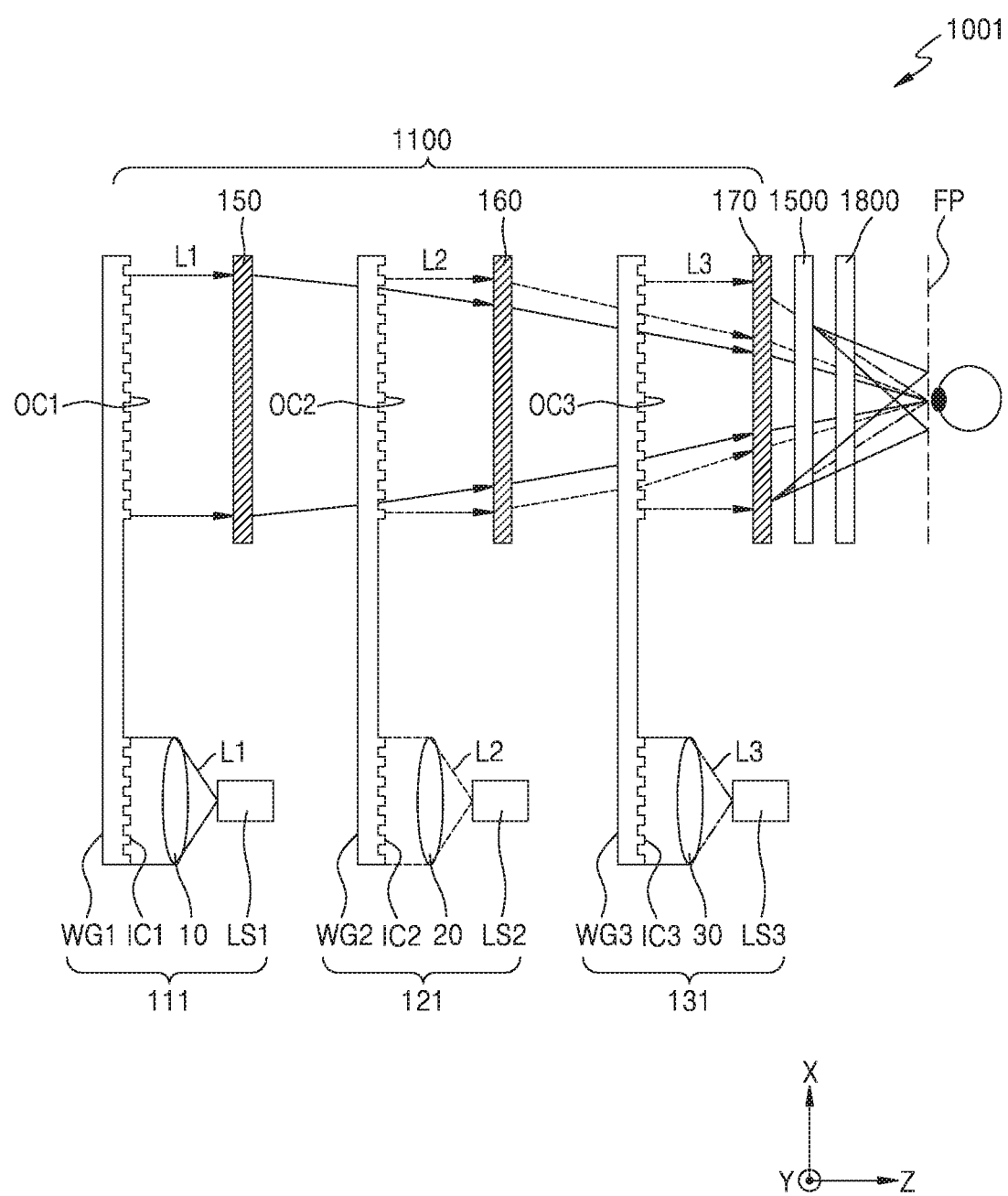
FIG. 8 illustrates a schematic configuration and an optical arrangement of a display device according to another example embodiment.

FIG. 8 illustrates a schematic configuration and an optical arrangement of a display device 1001 according to another example embodiment.

The display device 1001 of the example embodiment is different from the display device 1000 of FIG. 7 in that the display device 1001 further includes a beam deflector 1500 adjusting the position of a hologram image.

The display device 1001 forms the hologram image on a predetermined position in an observer's view, and thus, the image may not be recognized when the position of the observer's eye changes from the predetermined position. The beam deflector 1500 may vary a position at which the optical device 1100 focuses light on a focal plane FP. The position may be variable along the X direction on the focal plane FP, but is not limited thereto. For example, the position may be variable along the Y direction and the beam deflector 1500 may be configured such that the position changes in a two-dimensional direction.

The beam deflector 1500 may be a liquid crystal deflector that diffracts incidence light to change a traveling direction of the incidence light. The beam deflector 1500 may be electrically controlled and adjust a direction in which light is deflected.

The display device 1001 may further include an eye tracking sensor in order to obtain information necessary for varying the focusing position. The beam deflector 1500 may be controlled such that the position of the observer's eye is determined by the eye tracking sensor and the light is focused on the other position on the focal plane FP.

In FIG. 8, the third lens 170, the beam deflector 1500, and the spatial light modulator 1800 are sequentially arranged, but embodiments are not limited thereto, and the order of the three components may change. For example, the positions of the third lens 170 and the beam deflector 1500 may be switched, and the positions of the third lens 170 and the spatial light modulator 1800 may be switched.

Although the display devices 1000 and 1001 of FIGS. 7 and 8 illustrate optical systems with respect to a single eye, these optical systems may be provided for both eyes. The beam deflector 1500 provided in the display device 1001 of FIG. 8 may be configured to divert light toward both eyes.

Figure 9:
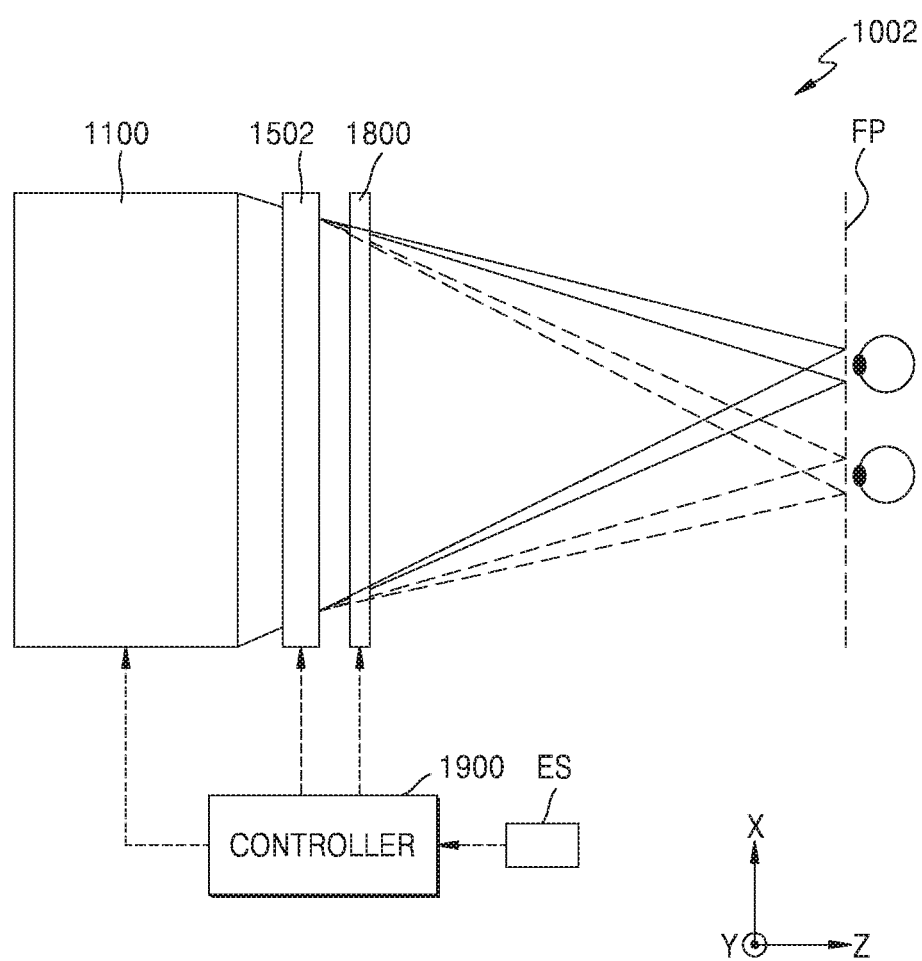
FIG. 9 illustrates a schematic configuration and an optical arrangement of a display device according to another example embodiment.

FIG. 9 illustrates a schematic configuration and an optical arrangement of a display device 1002 according to another example embodiment.

The display device 1002 of the example embodiment is different from the display device 1001 of FIG. 8 in that a beam deflector 1502 has a configuration in which light is diverted toward both eyes, and the remaining configuration is substantially the same.

The display device 1002 includes the optical device 1100 that provides focusing light with little or no chromatic aberration, the beam deflector 1502, and the spatial light modulator 1800. The display device 1002 may further include an eye tracking sensor ES that senses the position of observer's both eyes and a controller 1900 that controls the beam deflector 1502 using information sensed by the eye tracking sensor ES.

The beam deflector 1502 may be a liquid crystal deflector that diffracts incidence light to produce two light beams traveling at different angles. The beam deflector 1502 may simultaneously and spatially divert light toward the left and right eyes. The beam deflector 1502 may sequentially divert light toward the left and right eyes. The beam deflector 1502 may be also electrically controlled and may adjust two directions in which the light diverts in detail. The detailed position change of the left and right eyes may be sensed by the eye tracking sensor ES, and the position where the beam deflector 1502 diverges light by utilizing the information sensed by the eye tracking sensor ES may change two-dimensionally on the parallel focal plane FP in parallel with the XY plane.

Figure 10:
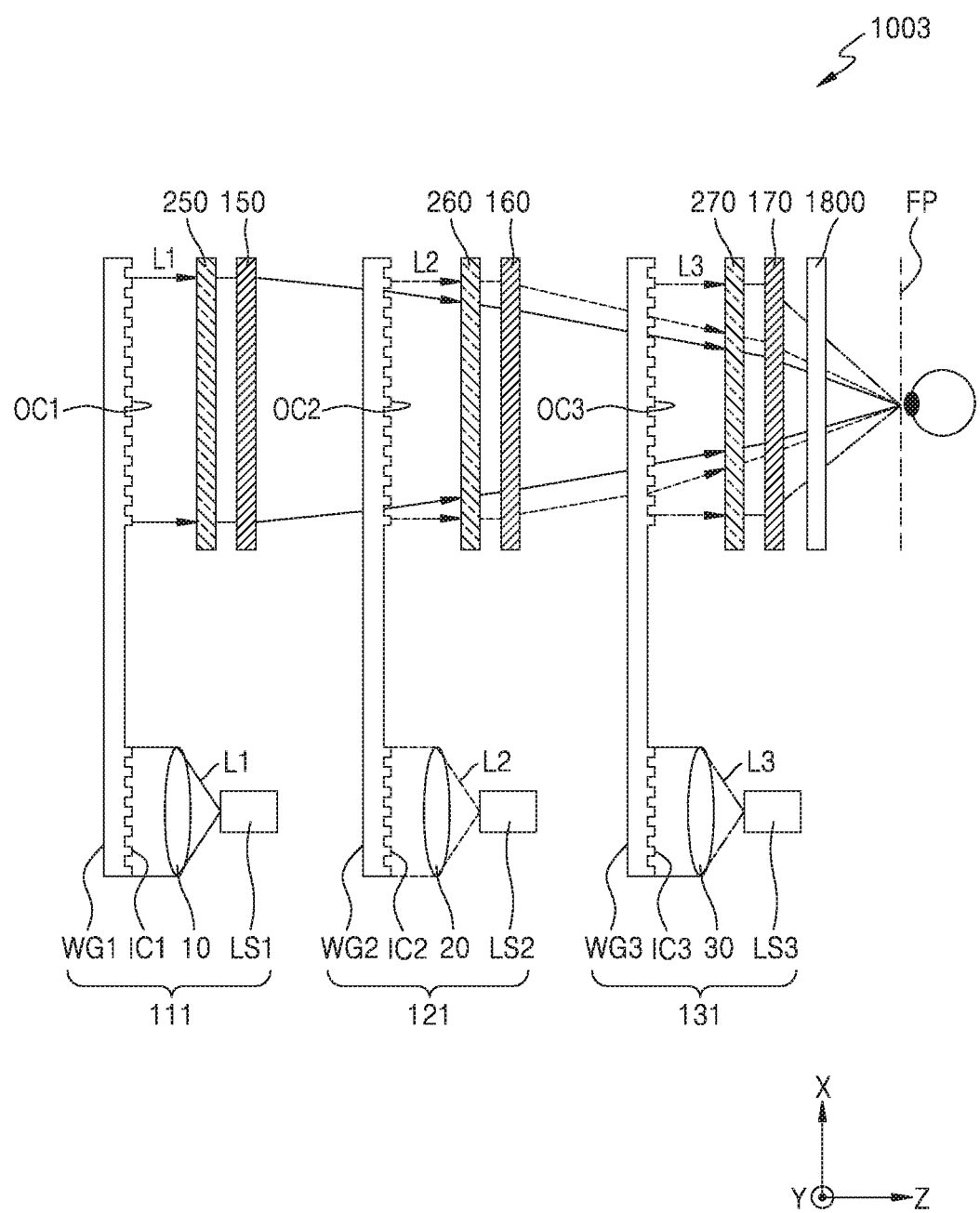
FIG. 10 illustrates a schematic configuration and an optical arrangement of a display device according to another example embodiment.

FIG. 10 illustrates a schematic configuration and an optical arrangement of a display device 1003 according to another example embodiment.

The display device 1003 of the example embodiment includes a configuration in which the optical devices 101 and 200 illustrated in FIGS. 3 and 5 are combined and the spatial light modulator 1800.

For example, the display device 1003 further includes the first beam deflector 250, the second beam deflector 260, and the third beam deflector 270 in addition to the display device 1000 illustrated in FIG. 7.

The first beam deflector 250, the second beam deflector 260, and the third beam deflector 270 may respectively adjust positions on which light is focused from the first backlight 111, the second backlight 121, and the third backlight 131 on the focal plane FP to reduce chromatic aberration. The first beam deflector 250 is disposed between the first output coupler OC1 and the second output coupler OC2, the second beam deflector 260 is disposed between the second the coupler OC2 and the third output coupler OC3, and the third beam deflector 270 is disposed in a traveling path of the light from the third output coupler OC3.

In FIG. 10, although the first beam deflector 250 and the first lens 150 are sequentially disposed between the first output coupler OC1 and the second output coupler OC2, the first lens 150 and the first beam deflector 250 may be sequentially arranged between the first output coupler OC1 and the second output coupler OC2. similarly, the positions of the second beam deflector 260 and the second lens 160 may be switched, and the positions of the third beam deflector 270 and the third lens 170 may be switched. In addition, the position of the spatial light modulator 1800 may also be changed to between the third beam deflector 270 and the third lens 170.

The first beam deflector 250, the second beam deflector 260, and the third beam deflector 270 may be configured as described in FIG. 5 such that the light L1 of the first wavelength is sequentially deflected by the first beam deflector 250, the second beam deflector 260 and the third beam deflector 270, the light L2 of the second wavelength is sequentially deflected by the second beam deflector 260 and the third beam deflector 270, and the light L3 of the third wavelength is deflected by the third beam deflector 270, and consequently the deflection directions of the light L1 of the first wavelength, the light L2 of the second wavelength, and the light L3 of the third wavelength are substantially identical.

The first beam deflector 250, the second beam deflector 260, and the third beam deflector 270 may also be electrically controlled and may adjust the direction in which light is deflected in detail.

The display device 1003 may further include the eye tracking sensor ES, and the first beam deflector 250, the second beam deflector 260, and the third beam deflector 270 may be controlled based on a signal sensed by the eye tracking sensor ES. According to the operations of the first beam deflector 250, the second beam deflector 260, and the third beam deflector 270, the position on which the light is focused may be adjusted two-dimensionally on the focal plane FP.

Figure 11:
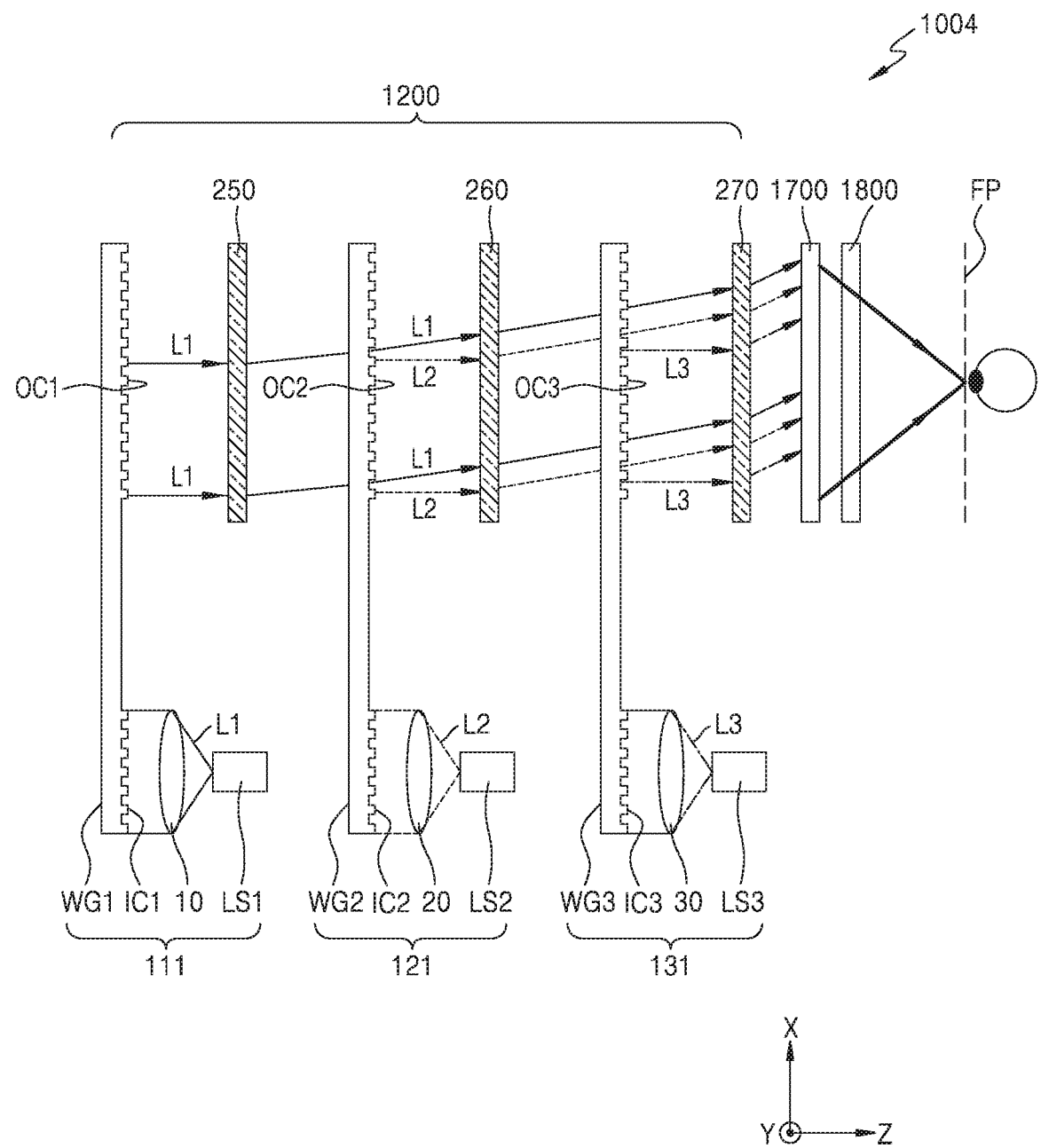
FIG. 11 illustrates a schematic configuration and an optical arrangement of a display device according to another example embodiment.

FIG. 11 illustrates a schematic configuration and an optical arrangement of a display device 1004 according to another example embodiment.

The display device 1004 includes an optical device 1200, a field lens 1700, and the spatial light modulator 1800.

The optical device 1200 may provide directional light with little or no chromatic aberration, and may have a configuration substantially the same as or modified from the optical device 200 described with reference to FIG. 5.

The spatial light modulator 1800 modulates light from the optical device 200 to generate a hologram image, and the field lens 1700 focuses the generated hologram image on a predetermined position. The positions of the field lens 1700 and the spatial light modulator 1800 may be switched.

Although the display device 1004 is illustrated as an optical system with respect to a single eye, such an optical system may be provided for both eyes. The first beam deflector 250, the second beam deflector 260, and the third beam deflector 270 provided in the optical device 1200 may be configured to divert light toward both eyes.

Figure 12:
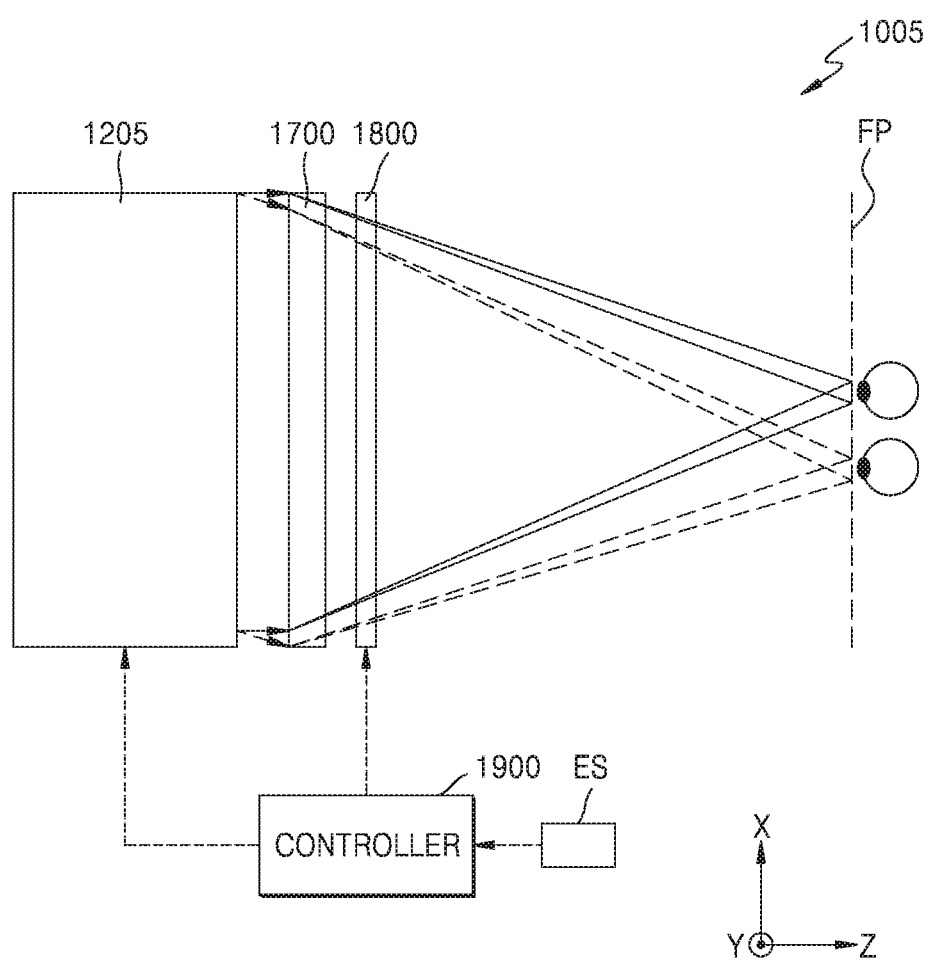
FIG. 12 illustrates a schematic configuration and an optical arrangement of a display device according to another example embodiment.

FIG. 12 illustrates a schematic configuration and an optical arrangement of a display device 1004 according to another example embodiment.

The display device 1004 includes an optical device 1205 that may provide directional light with little or no chromatic aberration, the field lens 1700 and the spatial light modulator 1800. The display device 1004 may further include the eye tracking sensor ES that senses the position of observer's both eyes and the controller 1900 that controls directionality of light from the optical device 1205 by using information sensed by the eye tracking sensor ES.

The display device 1004 according to the example embodiment is different from the display device 1003 of FIG. 11 in that the first beam deflector 250, the second beam deflector 260, and the third beam deflector 270 of the optical device 1200 provided in the display device 1003 of FIG. 11 include the optical device 1205 configured to divert light toward both eyes.

The light from the optical device 1205 may be diverted toward both eyes, and the divergence direction may be adjusted according to the detailed position of both eyes, and a direction adjustment with little deviation according to wavelengths is possible.

Although it is described that the above-described optical devices 100, 101, 102, and 200 are applied to display devices, embodiments are not limited thereto. For example, the above-described optical devices 100, 101, 102, and 200 may be employed to various electronic devices in which focusing light or directional light with little deviation according to the wavelengths may be utilized.

The above-described display devices 1000, 1001, 1002, 1003, 1004, and 1005 may be applied to various types of wearable device displays such as head mounted displays (HMDs), glasses-type displays, and goggle-type displays, etc.

The above-described display devices 1000, 1001, 1002, 1003, 1004, and 1005 may also operate in conjunction with or connected to other electronic devices, such as a smart phone. For example, a controller or a processor driving the display devices 1000, 1001, 1002, 1003, 1004, and 1005 may be provided in smart phones, and the above-described display devices 1000, 1001, 1002, 1003, 1004, and 1005 may be provided in the smart phones.

The above-described optical device may minimize the deviation according to the wavelengths in controlling the direction of light of different wavelengths.

The above-described optical device may be applied to a lens, a beam deflector, etc., with little chromatic aberration, and may be applied to a display device that improves the image quality.

While the optical device and the display device including the optical device have been shown and described with reference to the example embodiments illustrated in the drawings, it will be understood by those of ordinary skill in the art that various changes in form and details may be made therein without departing from the spirit and scope as defined by the following claims. It should be understood that example embodiments described herein should be considered in a descriptive sense only and not for purposes of limitation. Descriptions of features or aspects within each example embodiment should typically be considered as available for other similar features or aspects in other embodiments.

What is claimed is:

1. An optical device comprising:
   a first backlight configured to output first light of a first wavelength, the first backlight comprising a first light source configured to emit the first light, and a first light guide plate comprising a first input coupler on which the first light from the first light source is incident and a first output coupler through which the first light output;
   a first lens disposed to face the first output coupler and having a refractive power with a focal length of f1_1 with respect to the first light of the first wavelength;
   a second backlight configured to output second light of a second wavelength, the second backlight comprising a second light source configured to emit the second light, and a second light guide plate comprising a second input coupler on which the second light from the second light source is incident and a second output coupler through which the second light output, the second output coupler being disposed in parallel to the first output coupler;
   a second lens disposed to face the second output coupler and having a refractive power with different focal lengths of f2_1 and f2_2 with respect to the first light of the first wavelength and the second light of the second wavelength, respectively;
   a third backlight configured to output third light of a third wavelength, the third backlight comprising a third light source configured to emit the third light, and a third light guide plate comprising a third input coupler on which the third light from the third light source is incident and a third output coupler through which the third light output, the third output coupler being disposed in parallel to the first output coupler; and
   a third lens disposed to face the third output coupler and having refractive power with different focal lengths of f3_1, f3_2 and f3_3 with respect to the first light of the first wavelength, the second light of the second wavelength, and the third light of the third wavelength, respectively.

2. The optical device of claim 1, wherein the first lens, the second lens, and the third lens are geometric phase lenses.

3. The optical device of claim 1, wherein a focal length of the first lens with respect to the first light of the first wavelength is f1_1, focal lengths of the second lens with respect to the first light of the first wavelength and the second light of the second wavelength are f2_1 and f2_2, respectively, and focal lengths of the third lens with respect to the first light of the first wavelength, the second light of the second wavelength, and the third light of the third wavelength are f3_1, f3_2, and f3_3, respectively, and EFL (f1_1, f2_1, and f3_1) that is a combination focal length of f1_1, f2_1, and f3_1 satisfies the following condition:

$|f3\_3 - EFL(f1\_1, f2\_1, f3\_1)|/f3\_3 < 0.0005.$

4. The optical device of claim 3, wherein EFL(f2_2, f3_2) that is a combination focal length of f2_2 and f3_2 satisfies the following condition:

$|f3\_3 - EFL(f2\_2, f3\_2)|/f3\_3 < 0.0005.$

5. The optical device of claim 1, wherein the first lens, the second lens, and the third lens operate with respect to light of a predetermined polarization, and
   the optical device further comprises at least one phase retarder configured to cause incident light of the predetermined polarization to be incident on the first lens, the second lens, and the third lens.

6. An optical device comprising:
   a first backlight configured to output first light of a first wavelength, the first backlight comprising a first light source configured to emit the first light, and a first light guide plate comprising a first input coupler on which the first light from the first light source is incident and a first output coupler through which the first light output;
   a first beam deflector disposed to face the first output coupler and configured to deflect the first light of the first wavelength at a predetermined angle of a1_1;
   a second backlight configured to output second light of a second wavelength, the second backlight comprising a second light source configured to emit the second light, and a second light guide plate comprising a second input coupler on which the second light from the second light source is incident and a second output coupler through which the second light output, the second output coupler being disposed in parallel to the first output coupler;
   a second beam deflector disposed to face the second output coupler, the second output coupler being configured to deflect the first light of the first wavelength and the second light of the second wavelength at different angles of a2_1 and a2_2, respectively;
   a third backlight configured to output third light of a third wavelength, the third backlight comprising a third light source configured to emit the third light, and a third light guide plate comprising a third input coupler on which the third light from the third light source is incident and a third output coupler through which the third light output, the third output coupler being disposed in parallel to the first output coupler; and
   a third beam deflector disposed to face the third output coupler, the third beam deflector being configured to deflect the first light of the first wavelength, the second light of the second wavelength, and the third light of the third wavelength at different angles of a3_1, a3_2, and a3_3, respectively.

7. The optical device of claim 6, wherein the first beam deflector, the second beam deflector, and the third beam deflector are diffraction-based deflectors.

8. The optical device of claim 6, wherein an angle at which the first beam deflector deflects the first light of the first wavelength is a1_1, angles at which the second beam deflector deflects the first light of the first wavelength and the second light of the second wavelength are a2_1 and a2_2, respectively, and angles at which the third beam deflector deflects the first light of the first wavelength, the second light of the second wavelength, and the third light of the third wavelength are a3_1, a3_2, and a3_3, respectively, and EDA(a1_1, a2_1, a3_1) that is a combination deflection angle of a1_1, a2_1, and a3_1 satisfies the following condition:

$|a3\_3-EDA(a1\_1,a2\_1,a3\_1)|/a3\_3<0.0005.$

9. The optical device of claim 8, wherein EDA(a2_2, a3_2) that is a combination deflection angle of a2_2 and a3_2 satisfies the following condition:

$|a3\_3-EDA(a2\_2,a3\_2)|/a3\_3<0.0005.$

10. A display device comprising:
the optical device of claim 1; and
a spatial light modulator configured to generate a hologram image by modulating the first light output from the first backlight, the second light output from the second backlight, and third light output from the third backlight.

11. The display device of claim 10, wherein the first lens, the second lens, and the third lens are geometric phase lenses.

12. The display device of claim 10, wherein a focal length of the first lens with respect to the first light of the first wavelength is f1_1, focal lengths of the second lens with respect to the first light of the first wavelength and the second light of the second wavelength are f2_1 and f2_2, respectively, and focal lengths of the third lens with respect to the first light of the first wavelength, the second light of the second wavelength, and the third light of the third wavelength are f3_1, f3_2, and f3_3, respectively, and EFL (f1_1, f2_1, and f3_1) that is a combination focal length of f1_1, f2_1, and f3_1 satisfies the following condition:

$|f3\_3-EFL(f1\_1,f2\_1,f3\_1)|/f3\_3<0.0005.$

13. The display device of claim 12, wherein EFL(f2_2, f3_2) that is a combination focal length of f2_2 and f3_2 satisfies the following condition:

$|f3\_3-EFL(f2\_2,f3\_2)|/f3\_3<0.0005.$

14. The display device of claim 10, further comprising a beam deflector configured to adjust a position of the hologram image generated by the spatial light modulator.

15. The display device of claim 10, further comprising:
a first beam deflector disposed between the first output coupler and the second output coupler, the first beam deflector being configured to deflect the first light of the first wavelength at a predetermined angle;
a second beam deflector disposed between the second output coupler and the third output coupler, the second beam deflector being configured to deflect the first light of the first wavelength and the second light of the second wavelength at different angles; and
a third beam deflector disposed such that the first light, the second light, and the third light output from the third output coupler is incident on the third beam deflector, the third beam deflector being configured to deflect the first light of the first wavelength, the second light of the second wavelength, and the third light of the third wavelength at different angles.

16. The display device of claim 15, wherein the first beam deflector, the second beam deflector, and the third beam deflector are diffraction-based deflectors.

17. The display device of claim 15, wherein an angle at which the first beam deflector deflects the first light of the first wavelength is a1_1, angles at which the second beam deflector deflects the first light of the first wavelength and the second light of the second wavelength are a2_1 and a2_2, respectively, and angles at which the third beam deflector deflects the first light of the first wavelength, the second light of the second wavelength, and the third light of the third wavelength are a3_1, a3_2, and a3_3, respectively, and EDA(a1_1, a2_1, a3_1) that is a combination deflection angle of a1_1, a2_1, and a3_1 satisfies the following condition:

$|a3\_3-EDA(a1\_1,a2\_1,a3\_1)|/a3\_3<0.0005.$

18. The display device of claim 17, wherein EDA(a2_2, a3_2) that is a combination deflection angle of a2_2 and a3_2 satisfies the following condition:

$|a3\_3-EDA(a2\_2,a3\_2)|/a3\_3<0.0005.$

19. The display device of claim 15, wherein the first beam deflector, the second beam deflector, and the third beam deflector are electrically controlled to adjust a direction in which incident light is deflected.

20. The display device of claim 19, further comprising an eye tracking sensor,
wherein the first beam deflector, the second beam deflector, and the third beam deflector are controlled based on a signal sensed by the eye tracking sensor.

21. A display device comprising:
the optical device of claim 6;
a spatial light modulator configured to generate a hologram image by modulating the first light of the first wavelength output from the first backlight, the second light of the second wavelength output from the second backlight, and the third light of the third wavelength output from the third backlight; and
a field lens configured to focus the hologram image generated by the spatial light modulator at a predetermined position.

22. The display device of claim 21, wherein the first beam deflector, the second beam deflector, and the third beam deflector are electrically controlled to adjust a direction in which incident light is deflected.

23. The display device of claim 22, further comprising an eye tracking sensor,
wherein the first beam deflector, the second beam deflector, and the third beam deflector are controlled based on a signal sensed by the eye tracking sensor.

* * * * *